Figure 1:
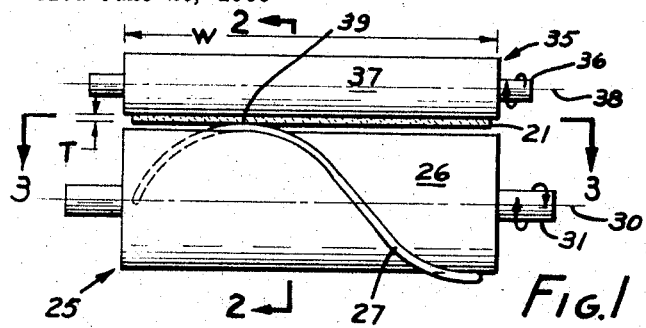

April 18, 1967  D. L. BURDORF ETAL  3,315,269
RECORDER

Filed June 29, 1965  3 Sheets-Sheet 1

INVENTORS
DONALD L. BURDORF,
GEORGE A. BOUVIER, DECEASED,
BY ERDINE BOUVIER, SPECIAL
ADMINISTRATRIX
BY Richard E. Bee
ATTORNEY

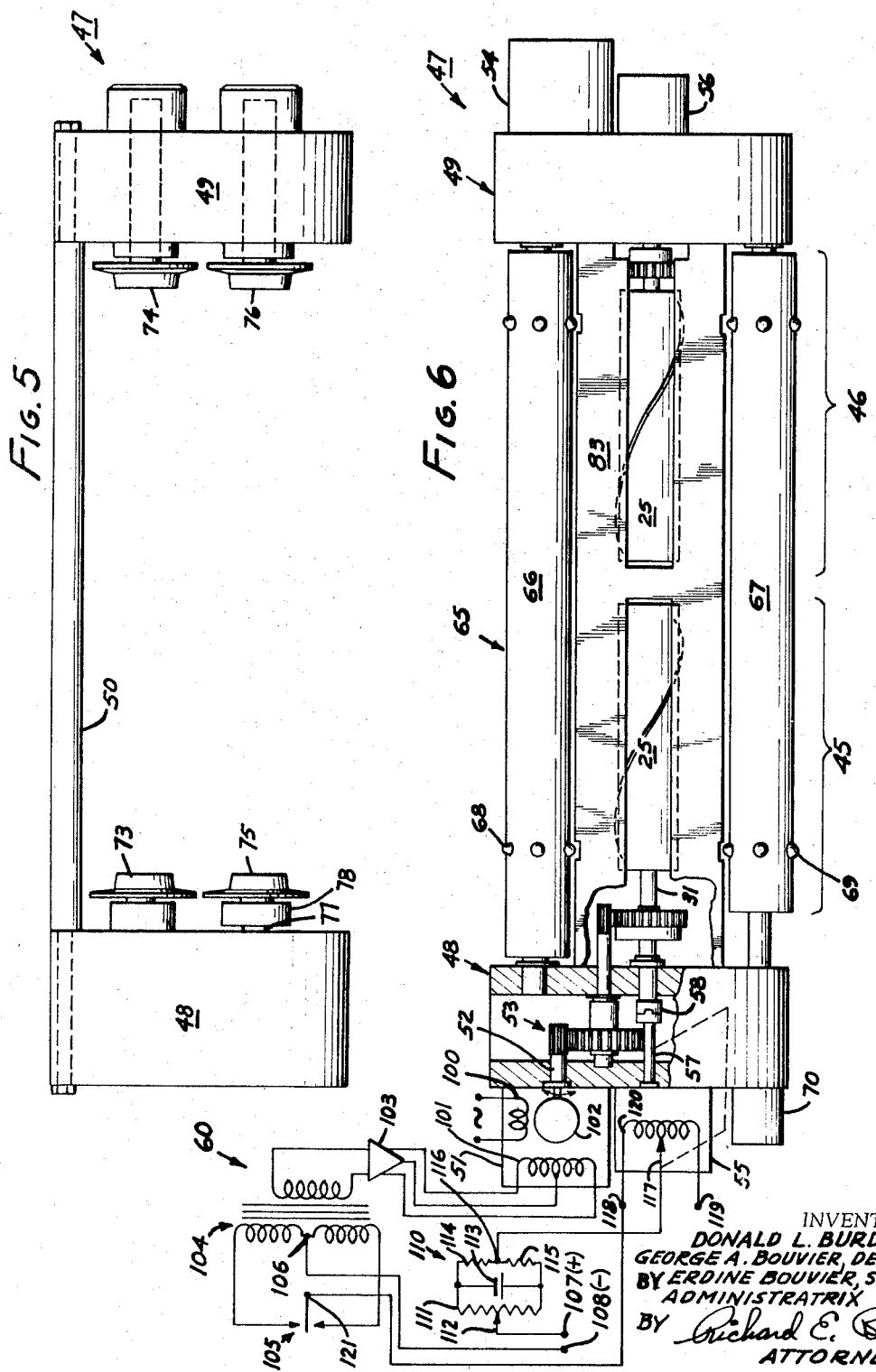

April 18, 1967   D. L. BURDORF ETAL   3,315,269
RECORDER
Filed June 29, 1965   3 Sheets-Sheet 3
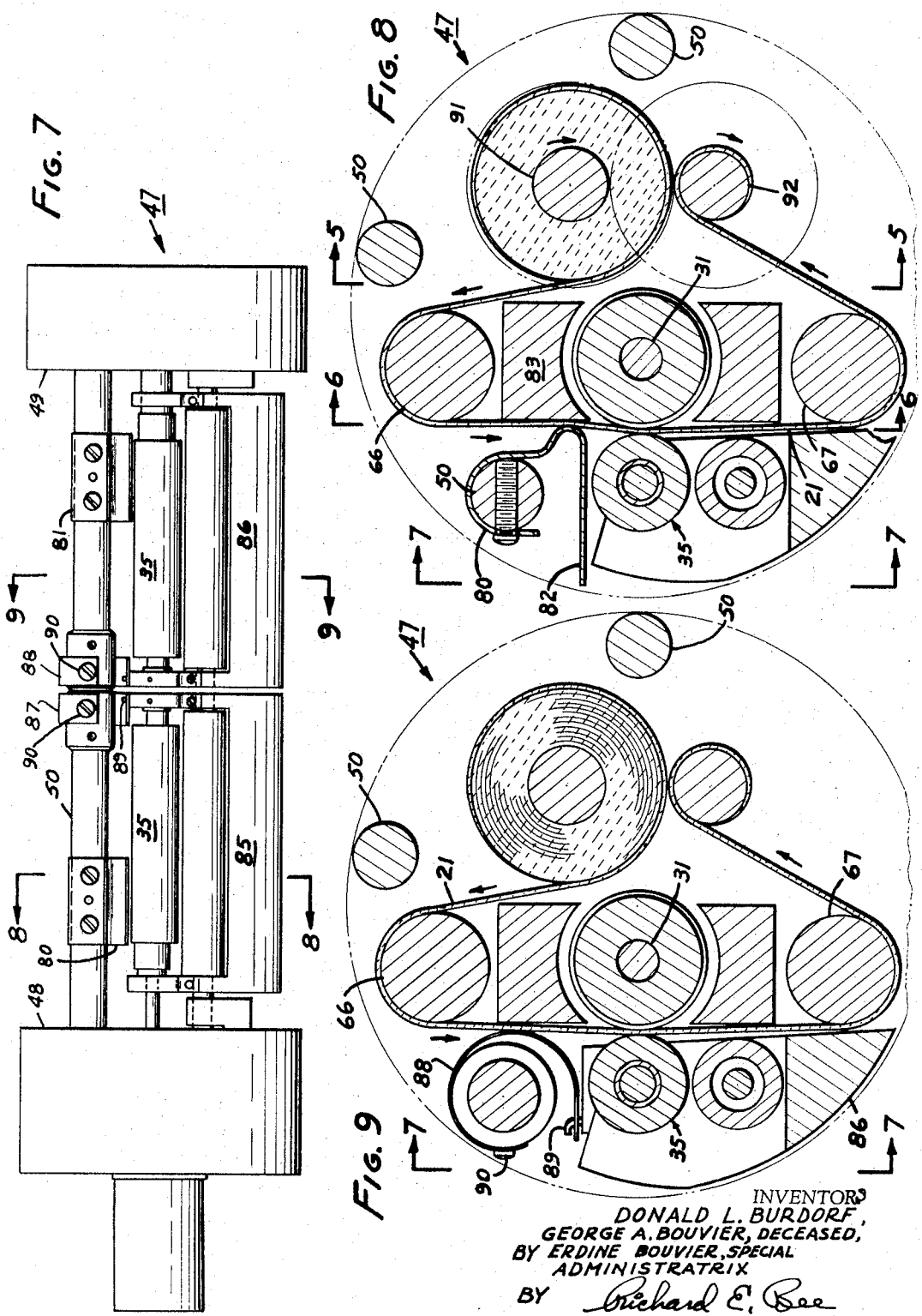
INVENTORS
DONALD L. BURDORF,
GEORGE A. BOUVIER, DECEASED,
BY ERDINE BOUVIER, SPECIAL
ADMINISTRATRIX
BY Richard E. Bee
ATTORNEY

United States Patent Office 3,315,269
Patented Apr. 18, 1967

3,315,269
RECORDER
Donald L. Burdorf, Arcadia, Calif., and George A. Bouvier, deceased, late of Sierra Madre, Calif., by Erdine Bouvier, special administratrix, Sierra Madre, Calif.; said Burdorf assignor, by mesne assignments, to Schlumberger Technology Corporation, Houston, Tex., a corporation of Texas
Filed June 29, 1965, Ser. No. 477,061
15 Claims. (Cl. 346—112)

This invention relates to a recorder, and in particular to a recorder suitable for recording data under severe conditions of temperature and vibration.

In the logging of oil wells, it is conventional practice to lower recording devices down the bore, there to record conditions that are being investigated. Conditions in the well are often extreme, and the devices must resist temperatures on the order of several hundred degrees Fahrenheit, and severe shock and vibration loads. Furthermore, it is desirable for the recorder to have a sufficiently long operating cycle without reloading that the device can remain in a well for a significant length of time without being withdrawn for servicing. This device of this invention provides chart paper which can last from four to eight hours without replacement.

The environmental conditions rule out many conventional recording techniques such as pens or thermally sensitive material, and the small envelope size rules out the rest. However, the recorder of this invention can be totally contained in a pressure-tight capsule only about 2½″ in diameter and carry a supply of twenty-five feet of chart paper, on which a continuous line or lines representative of a signal or signals can be reliably drawn without being adversely affected by temperature, shock or vibration.

A recorder according to this invention records on a chart having dimensions of length, width and thickness. It includes a helical element having a central axis and a radially outermost helical surface whose locus lies on a coaxial cylinder. A rotatably mounted marking element has a central axis and an axially extending cylindrical marking surface. The axes are parallel, and the surfaces are spaced apart by a distance not greater than the thickness of the chart. Chart drive means is provided for moving the chart between said surfaces. Marking element drive means is provided for rotating the marking surface at a surface speed different than the tangential speed of the chart.

A signal-responsive helical element positioning means is drivingly connected to the helical element, and is adapted to rotate the helical element to a position representative to a signal. The tangent point of the said helical surface and the chart thereby occupies a position along the axis of the helical element which is determined by the angular position of the helical element, and the marking surface makes a mark on the chart at this tangent position on the opposite side of the chart from the tangent point. The marking surface and the helical simultaneously bear against opposite sides of the chart at the tangent positions so as to make a mark at the tangent point representative of the signal.

According to a preferred but optional feature of this invention, the marking surface comprises a material which is transferable to the chart.

According to still another preferred but optional feature of this invention, the signal-responsive helical element positioning means includes a position-responsive means such as a potentiometer that is rotatably coupled to the helical element. A reversible motor is drivingly connected to the helical element, and comparator means is disposed and arranged as to compare the angular position to a signal, and to supply power to the reversible motor to conform the angular position to the input signal.

Figure 2:
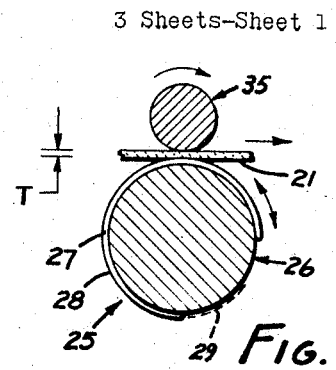
Figure 3:
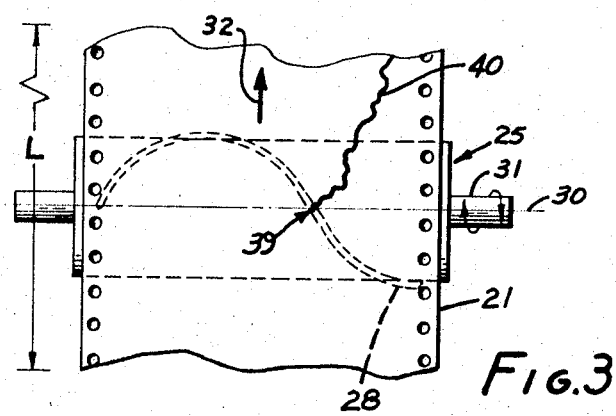
Figure 4:
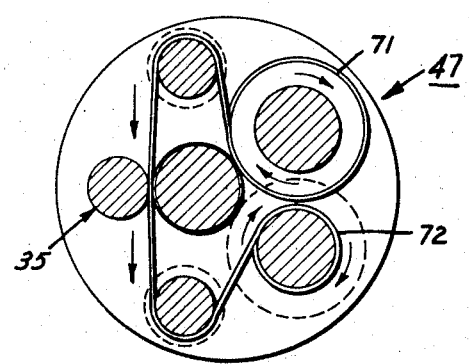
Figure 10:
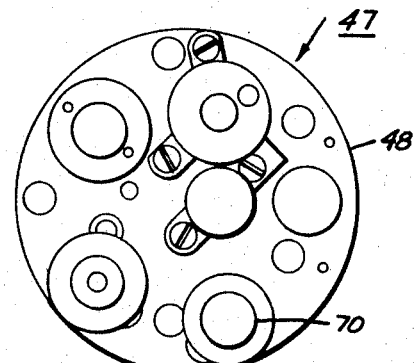

The above and other features of this invention will be fully understood from the following detailed description and the accompanying drawings, in which:

FIG. 1 is a side elevation, partly in cutaway cross-section, illustrating a portion of the invention;
FIG. 2 is a cross-section taken at line 2—2 of FIG. 1;
FIG. 3 is a cross-section taken at line 3—3 of FIG. 1;
FIG. 4 is an abbreviation of FIG. 9, which in turn is a cross-section taken at line 9—9 of FIG. 7;
FIGS. 5 and 6 are abbreviated views of portions of FIG. 7;
FIG. 7 is a side elevation of the device;
FIGS. 8 and 9 are cross-sections taken at lines 8—8 and 9—9, respectively, of FIG. 7; and
FIG. 10 is a left hand end view of FIG. 6.

The presently preferred embodiment of the invention is shown in the drawings. The objective of the device is to create a trace on a chart 21 which chart is made of flexible material such as paper that has dimensions of length L, width W, and thickness T (see FIGS. 1–3.) That portion of the mechanism which causes the mark to be made on the chart is shown in abbreviated form in FIGS. 1–3, and in more complete form in the remaining drawings.

There is included in the device a helical element 25 that comprises a backing cylinder 26 with a projecting element 27 laid on the cylindrical surface of the backing cylinder. This projecting element has a radially outermost helical surface 28 the locus of which lies on a theoretical cylinder 29 which is coaxial with axis 30 of the helical element. Cylinder 29 is spaced from axis 30 by distance equal to the radius of backing cylinder 26 plus the thickness of the projecting element 27. It will thereby be seen that at any position tangent to surface 28 there will be only one point of tangency with a plane such as one which contains axis 30 and is normal to FIG. 3. The location of this point along the dimension of width W is determined by the angular position of helical element 25. Shaft 31 serves to rotate helical element 25.

The chart is drawn past the helical element at a velocity determined by means yet to be described, and in the direction indicated by arrow 32.

A marking element 35 is rotatably mounted by an axial shaft 36, and is driven unidirectionally by means yet to be described. It includes an exterior circularly cylindrical marking surface 37 which is coaxial with axis 38 of the marking cylinder. The marking surface is made of a material which will transfer to the paper. A graphite rod such as is used in hard pencils has been found to be suitable. The axes 30 and 38 are so positioned that the spacing between tangent point 39 (wherever along the axis it may be located) and the marking surface is no greater than the dimension of thickness T in order that, as the marking surface rotates it can press the paper against the radially outermost helical surface 28 at the point of tangency and thereby make a mark. As the chart moves along in the direction of arrow 31, a trace 40 (FIG. 3) results which is representative of an input signal when the angular position of the helical element is representative of the input signal. It is the function of apparatus yet to be described to provide, in a small compact envelope, means for drawing the chart between the helical element and the marking element at a constant speed to cause the marking element to rotate and to cause the helical element to assume an angular position representative of the signal.

Because the device is quite compact, its illustration has been divided into several views. The most complete view is shown in FIG. 7 which illustrates that there is a pair of channels 45, 46. A plurality of conditions can therefore be recorded at one time with the same device. The chart drives marking elements, and helical elements of these channels are separate. However, the chart drives and marking elements are connected to a common source of power, while the helical elements are separately powered. The channels are essentially mirror images of each other so that only channel 45 will be described. Of course, only one channel need be provided or used.

As can best be seen in FIGS. 5–7, recorder 47 includes a pair of end frames 48, 49 which serve as structure at the end tied together by a plurality of tie rods 50 (FIG. 5). This provides a unitary framework within which the remaining elements can be journaled and mounted. The gear trains are mounted to these end frames, but their details are omitted, because they are conventional. Their gearing is selected to provide the appropriate speeds needed for the various parts of the recorder. A bi-directional, reversible servo motor 51 (FIG. 6) is mounted to end frame 48. Its output is transmitted by a signal shaft 52. The signal shaft position is in turn transmitted through a gear train 53 to shaft 31 of helical element 25.

The helical element 25 in channel 46 is driven separately by servo motor 54 through a similar gear train (not shown) in end frame 49.

A position-responsive means 55 is provided for channel 45, and a like means 56 is provided for channel 46. Each of these means comprises a potentiometer whose function will be described in greater detail below. It will be noted that means 55 has a shaft 57 which is joined by coupling 58 to shaft 31 of the helical element. In channel 46, a like arrangement is made. It will thereby be noted that rotation of servo motor 51 angularly positions helical element 25 in channel 45, and thereby establishes a setting of potentiometer 55. Comparator means 60 (see FIG. 6) are operative to cause the servo motor to render the angular position of the helical element representative of the input signal. Customarily this representation will often be a straight line relationship, but this is not a necessary situation.

Chart drive means 65 (FIG. 6) includes a pair of sprocket shafts 66, 67 which include sprocket teeth 68, 69. A drive motor 70 drives sprocket shaft 67 through gear trains (not shown). Shaft 66 idles.

The chart (FIGS. 4 and 5) itself is paid out from a supply spool 71 and collected on a take-up spool 72. These spools are mounted on journals 73–76 as best shown in FIG. 5. Journals 73 and 74 may be set to drag a bit, and are not powered, although they may be. The take-up spool is driven through a shaft 77 which is turned by motor 70 through a gear train (not shown). This shaft operates at a normal speed which is greater than that which corresponds to the actually desired speed of the paper through the device. A slip means 78 such as a friction clutch is interposed between shaft 77 and journal 75. This arrangement assures that sufficient torque will be exerted on the take-up spool to keep the chart material drawn tightly as it is wound upon the spool. Thus, sprocket 67 and the take-up spool constitute the powered elements of the chart drive means. In the various views, mechanism mounted to the end plates unnecessary to an understanding of that view have been omitted, due to the complexity of the device. FIG. 10 indicates the actual construction at the outside of end plate 48.

Means is also provided for guiding the chart material through the device which comprises friction brakes 80, 81 (FIG. 7) that are attached to one of the tie rods. Friction brake 80 is best shown in FIG. 8. Brake 81 in channel 46 is like brake 80. Brake 80 comprises a spring clip 82 adapted to bear against the chart material and presses it against a backing block 83. This creates a drag force which prevents the paper from slewing as it passes through the device and aids in maintaining tension on the paper. The chart material is in a single strip the width of the two channels, although it could be provided in two strips, if preferred. The single width strip is easier to control.

A pair of yokes 85, 86 is pivotally mounted to another of the tie rods. Each carries a respective one of marking elements 35. The objective of this type of mounting is to enable the marking element to be resiliently pressed toward the chart material, because the yokes enable the marking elements to be moved toward and away from the chart. As can best be seen in FIG. 9, a pair of bias springs 87, 88 are provided to press the marking elements against the chart. These bias springs are mounted to a tie rod and have a free end which engages a projection 89 on the respective yoke to bias the marking element toward the chart. The force exerted by the marking element is adjustable by means of set screw 90. The angular position, and therefore the preload of the springs can be adjusted by winding the spring around the tie rod and then tightening the set screw at the correct setting.

A pair of idler shafts 91, 92 guide the chart material into and out of the area where the recording action takes place. As can best be seen in FIGS. 8 and 9, the supply and take-up spools have their centers set apart far enough that, as the supply grows on one and dwindles on the other the contents of the spools will not interfere with each other.

The foregoing illustrates the construction of the device whereby material is withdrawn from one of the spools and wrapped onto the other, meanwhile being passed, under suitable tension, between the marking element and the helical element so as to produce a trace thereon. The trace position is dependent solely upon the angular position of the helical element, and the marking is entirely independent of vibration and temperature effects. The remainder of the device yet to be described is for the purpose of setting the angular position of the helical element at a position representative of an input signal, whereby the input signal is represented by a mark produced by virtue of the compressive contact of the chart material with the marking element at the tangent point. It is evident that the marking cylinder must operate at a surface speed which is different from that of the chart material as it passes under it, or no mark will be made. Customarily the marking cylinder will be rotated in the direction opposite that of the tangent motion of the paper although this is not necessary. It may operate in the same direction provided, that its surface speed is different from that of the chart material.

A circuit suitable for use in controlling the angular position of shaft 31 will now be described. Circuitry which is responsive to a signal and which serves in turn to cause the servo motor to adjust the position of the helix is shown in FIG. 6. Servo motor 54 is shown in somewhat greater detail in this figure. In one successful embodiment of this invention, a four hundred cycle motor is used which includes a reference phase 100 and a control phase 101. Armature 102 is connected to signal shaft 52 for positioning the same. A signal amplifier 103 of the push-pull type is connected to the control phase windings for actuating the motor bi-directionally in accordance with the signal. In turn, the amplifier is coupled to the secondary of a transformer 104 from which the signal is derived.

A chopper 105 is connected across the primary winding of the transformer, the actuating coil for the chopper being externally powered by circuitry not shown. The chopper operates at the same frequency as the servo motor, in this case four hundred cycles.

It will be seen that the chopper converts the D.C. voltage to a pulsating signal suitable for actuation of the signal amplifier, and that the amplitude of the signal may be determined by the voltage applied to mid-point 106 of the primary winding to transformer 104. Signal input terminals 107, 108 receive the signal to be represented on the chart from a transducer. Terminal 107 is the positive side, and 108 is the negative side. Terminal 108 is connected to point 106 in the transformer while terminal 107 is connected to a D.C. off-set adjustment means 110 which comprises a potentiometer 111 with an adjustable tap 112, a reference battery 113 across the terminals of the potentiometer coil, and in parallel with the foregoing a pair of equal resistances 114, 115. A tap 116 between resistances 114 and 115 is connected to contact 117 of potentiometer 55. The purpose of the D.C. off-set adjustment means is to standardize the voltage at contact 117 of the potentiometer. The potentiometer winding has a pair of terminals 118, 119 which are connected to a reference voltage, which in one successful embodiment is 100 mv. Attention is called to point 120 on the coil to which later reference will be made.

Rotation of shafts 31 and 58 cause contact 117 to be moved to adjust the voltage between the conductive point of contact 117 with the coil and point 120, point 120 being at the same potential as terminal 118. Point 120 is in turn connected to terminal 121 of the chopper. In the operation of this device, a reference voltage is applied across terminals 118 and 119 and an input voltage is applied across terminals 107 and 108. Tap 112 is adjusted to provide a desired voltage level at contact 117, and the chopper is placed in operation.

If there is a difference in voltage between contact 117 and point 120 and the voltage at point 106, then an output signal will be developed at the signal amplifier which on being amplified will rotate the motor 54 at output shaft 52 so as to turn the helical element, thereby readjusting the potentiometer so as to reduce the difference between the two levels. The levels of points 106 and 117 are of the same polarity, therefore bucking each other. When levels of 108, 107 and 117, 120 are the same (polarity the same) no current flows through the transformer. Then there will be no signal provided to the signal amplifier and the motor and shafts will be in the desired position. It will thereby be seen that there is a unique rotary position of the helical element for every input voltage, the potentiometer causing the servo motor to operate to eliminate the difference between the aforesaid two voltages, thereby maintaining the position of the helical element and the point of tangency with the chart at a value presentative of the input signal.

Persons skilled in the art can readily supply the specifications for the various components of the circuits, and it is not believed necessary to provide them here. Also, it will be recognized that there are other ways of accomplishing the same servo response so as to maintain the rotary adjustment of the helical element in a position representative of the input signal.

The term helical element has been used herein to define an element which has a radially outermost surface which generally progresses along the axis of the cylinder of the element as it simultaneously extends around its periphery. This need not be a constant pitch arrangement or even one which is continuous. Persons skilled in the art will readily recognize techniques whereby additional variables may be supplied by varying the path of the radially outermost surface.

The device as described and illustrated above comprises a compact vibration and temperature proof device capable of providing multiple channels of operation for recording information over long periods of time substantial independent of external conditions. It will be recognized that the device as shown is not intended for immersion in liquids, but instead will be contained within a casing (not shown) which will be fluid tight and resistant to external pressure. The compact arrangement illustrated permits it to be contained in envelopes small enough to be lowered into wells of small internal diameter, this being merely one use of this class of recorder.

The invention is not to be limited by the embodiment shown in the drawings and described in the description which is given by way of examples and not of limitation, but only in accordance with the scope of the appended claims.

What is claimed is:

1. A recorder for recording data on a continuous chart having a dimension of thickness, said recorder comprising: a helical element having a central axis and a radially outermost helical surface whose locus lies on a coaxial cylinder; a rotatably mounted marking element having a central axis and an axially extending cylindrical marking surface, said axes being parallel, and said surfaces being spaced apart by a distance not greater than the thickness of the chart; chart drive means for moving the chart between said surfaces; marking element drive means for rotating the marking surface at a surface speed different than the tangential speed of the chart; and signal-responsive helical element positioning means drivingly connected to the helical element adapted to rotate the helical element to a position representative of a signal, whereby the tangent point of the said helical surface and the chart occupies a position along the axes which is determined by the angular position of the helical element, and whereby the marking surface makes a mark on the chart at said tangent position on the opposite side of the chart from the tangent point, the marking surface and the helical simultaneously bearing against opposite sides of the chart at said tangent position to make a mark at said point representative of the signal.

2. A recorder according to claim 1 in which the marking surface comprises a material which is transferable to said chart.

3. A recorder according to claim 1 in which the helical element comprises a backing cylinder having a peripheral surface and a projecting element mounted to said backing cylinder and projecting therefrom to form said helical surface spaced from the said peripheral surface.

4. A recorder according to claim 1 in which the chart drive means comprises a sprocket drive so disposed and arranged as to draw the chart between the said surfaces.

5. A recorder according to claim 4 in which the chart drive additionally includes a supply and a take-up spool, from and to which the chart is passed as it goes between the said surfaces, in which the take-up spool is driven at a surface speed greater than that permitted by the sprocket drive, and in which slip means is provided to enable the take-up spool to rotate at a lesser angular velocity than the speed at which it is driven, whereby the take-up spool maintains tension on the chart while the sprocket drive determines the speed at which the chart moves between the surfaces.

6. A recorder according to claim 1 in which the marking element is resiliently biased toward the helical element.

7. In combination: a flexible chart having dimensions of length, width and thickness; a helical element having a central axis lying substantially parallel to the dimension of width and a radially outermost helical surface whose locus lies on a coaxial cylinder; a rotatably mounted marking element having a central axis and an axially extending marking surface, said axes being parallel, and said surfaces being spaced apart by a distance not greater than the thickness of the chart; chart drive means for moving the chart between said surfaces; marking element drive means for rotating the marking surface at a surface speed different than the tangential speed of the chart; and signal responsive helical element positioning means drivingly connected to the helical element adapted to rotate the helical element to a position representative of a signal, whereby the tangent point of the said helical surface and the chart occupies a position along the axes which is determined by the angular position of the helical element, and whereby the marking surface makes a mark on the chart at said tangent position on the opposite side of the chart from the tangent point, the marking surface and the helical surface simultaneously bearing against opposite sides of the chart at said tangent position to make a mark representative of the signal.

8. A combination according to claim 7 in which the marking surface comprises a material which is transferable to said chart.

9. A combination according to claim 7 in which the helical element comprises a backing cylinder having a peripheral surface and a projecting element mounted to said backing cylinder and projecting therefrom to form said helical surface spaced from the said peripheral surface.

10. A combination according to claim 7 in which the chart drive means comprises a sprocket drive so disposed and arranged as to draw the chart between the said surfaces.

11. A combination according to claim 10 in which the chart drive additionally includes a supply and a take-up spool, from and to which the chart is passed as it goes between the said surfaces, in which the take-up spool is driven at a surface speed greater than that permitted by the sprocket drive, and in which slip means is provided to enable the take-up spool to rotate at a lesser angular velocity than the speed at which it is driven, whereby the take-up spool maintains tension on the chart while the sprocket drive determines the speed at which the chart moves between the surfaces.

12. A combination according to claim 7 in which the signal-responsive helical element positioning means comprises a reversible motor drivingly connected to the helical element, a position responsive means rotatably coupled to the helical element, and comparator means responsive to an input signal and to the position responsive means for supplying power to the motor to cause it to conform the angular position of the helical element to the magnitude of the input signal.

13. A combination according to claim 12 in which the position responsive means comprises a potentiometer which potentiometer is connected to a source of reference voltage, thereby to create an output voltage proportional to the angular position of the helical element and in which the comparator means opposes said voltage with a voltage derived from an input signal and applies a signal to the reversible motor which operates the motor so as to eliminate said last-named signal.

14. A combination according to claim 13 in which the said output voltage from the potentiometer is supplied to a chopper, and the chopper output is supplied to the terminals of a transformer primary winding, in which an input signal is supplied to a center tap of said winding, the terminals of the secondary winding of said transformer supplying power to said reversible motor.

15. A combination according to claim 14 in which the output from the secondary winding is supplied to an amplifier and the amplifier output is supplied to the reversible motor.

References Cited by the Examiner

UNITED STATES PATENTS 2,044,586    6/1936    Marcellus _____ 346—46

RICHARD B. WILKINSON, *Primary Examiner.*

M. L. LORCH, *Assistant Examiner.*